Jan. 4, 1944. H. E. WEBB 2,338,145
LINE SUPPORTING CLIP
Filed Sept. 29, 1941
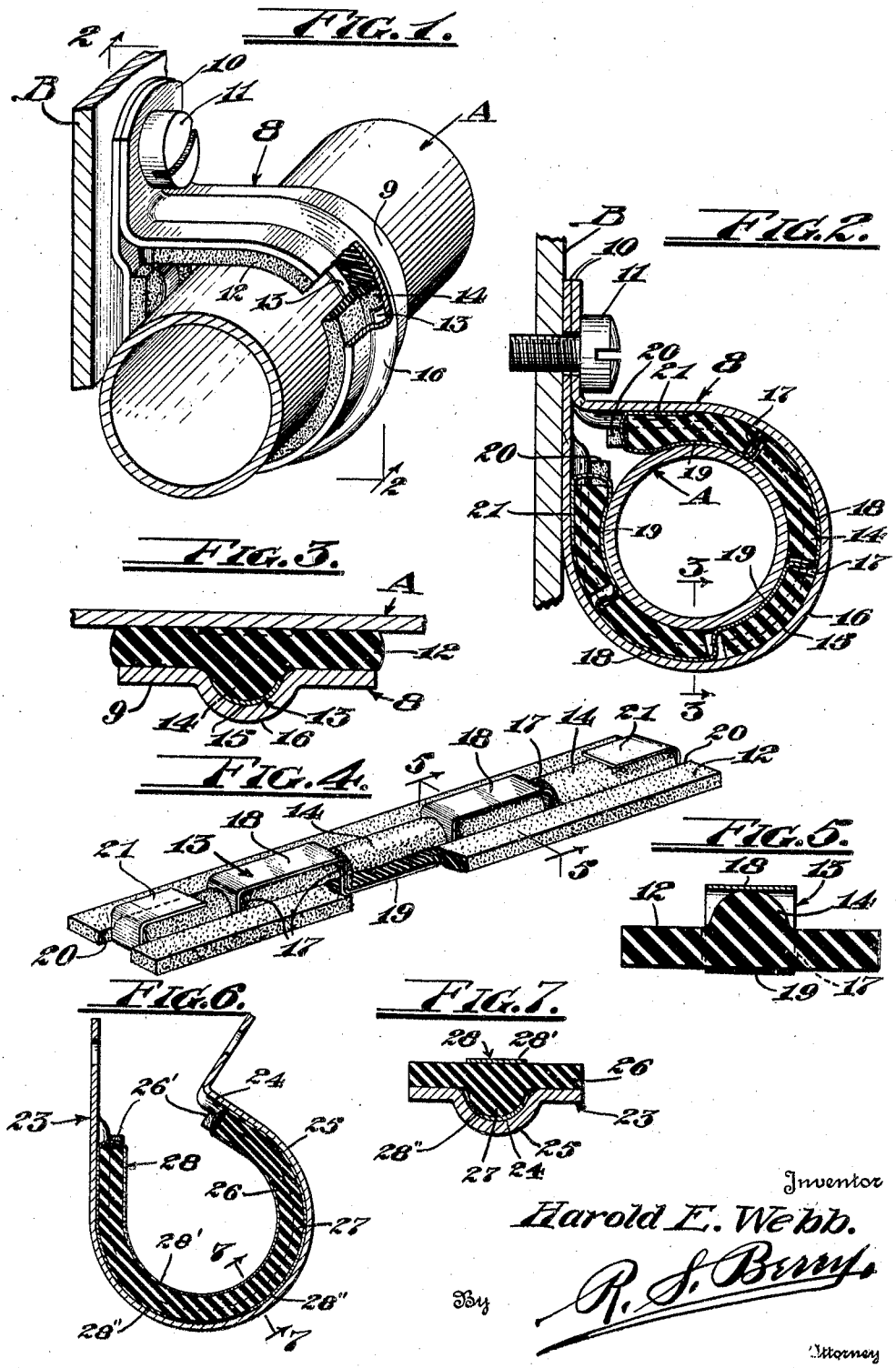
Inventor
Harold E. Webb.
By R. S. Berry
Attorney Patented Jan. 4, 1944

2,338,145

UNITED STATES PATENT OFFICE 2,338,145

LINE SUPPORTING CLIP

Harold E. Webb, Burbank, Calif., assignor to Adel Precision Products Corp., a corporation of California Application September 29, 1941, Serial No. 412,783

8 Claims. (Cl. 174—40)

My invention relates to clips for securing the air, oil, gas, hydraulic and other lines in aircraft and resides in the provision of an improved clip of the type shown in United States Patent Number 2,215,283 issued Sept. 17, 1940, to Paul W. Adler. Such a clip comprises a metallic conduit embracing strap adapted to be secured to a metallic structural part of an airplane, a resilient conduit embracing cushion of rubber or like resilient insulation material lining the strap to absorb vibrations and prevent wear of the conduit and a metal strip associated with the cushion so as to be held in contact with the conduit and the metallic strap whereby the conduit is electrically grounded or bonded to the metal structure of the plane to prevent dangerous accumulations and discharges of static electricity.

Due to the vibratory movement of the numerous conduit lines in the modern airplane such conduits are often imparted considerable longitudinal movement which tends to derange the cushioned clips employed to secure the conduits as aforesaid. Should the cushion of one of the clips be moved axially relative to the metallic strap or vice-versa, it may become dislodged or shifted from proper cushioning position and likewise derange or shift the bonding strip such that the bonding or grounding of the conduit at the deranged clip is impaired or broken. Such derangements tend to and sometimes do defeat the purpose of the clip as to the securing, cushioning and electrical grounding functions thereof.

It is now apparent that it is most important to provide a connection between the cushion and the metallic strap that will prevent dislodgement, shifting or derangement thereof and likewise, important to associate the bonding strip with the cushion and strap in such manner as to insure good electrical contact of the strip with the conduit and the strap regardless of the vibratory movement of the strap and conduit or any relative movement permitted of or imparted to the cushion and strap.

One of the objects of the present invention is to provide an improved conduit clip of the character described in which the strap and cushion are especially constructed, co-related and arranged to insure the retention of the cushion in proper position over long periods of use regardless of vibratory movement of the conduit and parts of the clip.

Another object of this invention is to provide a conduit clip such as described wherein the aforesaid mounting provision for the cushion and strap materially strengthen and reinforce both members and the clip as a whole and render the clip more stable and reliable for its purpose.

Another object of my invention is to provide a conduit clip such as hereinbefore noted wherein the bonding strip and cushion are united in such manner as to more effectively hold the strip in good electrical contact with the conduit and strap and more securely fix the strip on the cushion.

Another object of my invention is to provide a clip of the character described wherein a rib or like protuberant portion of the cushion fits into a groove or depression on the strap to interlock the cushion and strap throughout the length of the cushion.

A further object of my invention is to provide in a clip such as described a rib and groove interlock between the cushion and metallic strap by means of which the metallic bonding strip is more effectively presented for and maintained in contact with the strap and conduit at all times and under all conditions of use of the clip in that such strip is presented with a portion thereof having a cross sectional shape conforming to that of and lying in the groove in the strap and thereby interlock therewith, and further said portion of the strip extends along and contacts the rib on the cushion longitudinally thereof while another portion of the strip extends longitudinally on the inner face of the cushion for contact with the conduit.

With the foregoing objects in view together with such other objects and advantages as may subsequently appear the invention is carried into effect as illustrated by way of example in the accompanying drawing in which:

Fig. 1 is a fragmentary perspective view of a clip embodying my invention, as when in use:

Fig. 2 is a sectional view on the line 2—2 of Fig. 1:

Fig. 3 is an enlarged sectional view on the line 3—3 of Fig. 2:

Fig. 4 is an enlarged fragmentary perspective view of the cushion and grounding strip assembly removed from the strap:

Fig. 5 is a sectional view taken on the line 5—5 of Fig. 4:

Fig. 6 is a sectional view of a modified form of the invention:

Fig. 7 is a sectional view taken on the line 7—7 of Fig. 6:

Referring to the drawing more specifically, the embodiment of my invention shown in Figs. 1 to 5 inclusive comprises a resilient bendable metallic strap 8 having a loop portion 9 adapted to embrace a conduit line A as shown in Figs. 1 and 2; aperture terminals 10 for reception of a screw or like fastening 11 whereby to secure the strap to and in contact with a metallic structural part of an airplane which part is indicated at B in Figs. 1 and 2, a substantially flat cushion 12 of resilient rubber or like resilient insulating material, and a highly flexible and bendable metallic grounding or bonding strip 13 associated with the cushion so as to contact the strap and the conduit line as best shown in Fig. 2.

In accordance with my invention the cushion 12 is interlocked throughout its length with the loop portion 9 of the metallic strap 8 to prevent displacement of the cushion. As here shown the cushion and strap are of approximately the same width and substantially rectangular in cross section, although they may obviously be of different widths if desired, and the cushion is provided along its longitudinal median line on the face thereof opposed to the inner surface of the strap, with a flexible rib 14 of semi-circular cross section. This rib is designed to fit snugly in a groove 15 of similar cross section formed in the inner face of the loop 9 of the strap 8. The groove 15 defines on the outer face of the loop 9 a rib 16, said rib and groove following the median line circumferentially of the loop. In this manner the cushion 12 and loop 9 of the strap are interlocked throughout their length at a point spaced equidistantly between their longitudinal edges. The inner or conduit engaging surface of the cushion is flat and disposed to effectively engage the conduit throughout its area. If desired the cushion may be cemented or otherwise adhered to the strap for holding the parts assembled.

Inasmuch as the rib and groove formation of the loop portion 9 of the strap serves as an effective reinforcing such formation preferably extends the full length of the loop portion as seen in Figs. 1 and 2. The cushion is preferably somewhat shorter than the loop portion as it is not necessary that the ends thereof meet as do the ends of the loop portion (see Fig. 2).

The bonding strip 13 is associated with the cushion 12, so that a part thereof is disposed in the groove 15 in the loop portion 9 and held therein by the resilient rib 14 on the cushion. The pressure of the rib 14 causes that part of the strip lying in the groove to become deformed or bent and to closely conform to the rib and said groove as shown in Fig. 3 and to be firmly held in the latter under the tension of the rib, whereby a good electrical contact is made and maintained between the strip.

Another part of the bonding strip 13 is disposed on the conduit engaging face of the cushion and thereby adapted to be resiliently held against the conduit to insure a good electrical connection therewith, since the cushion is compressed between the strap and conduit when the clip is secured in place as shown in Figs. 1 and 2.

As best shown in Figs. 2 and 4 the strip 13 is reeved through transversely extending apertures or slots 17 in the cushion 12 so as to define a plurality of strap engaging portions or segments 18 on one side of the cushion and a plurality of similar conduit engaging portions or segments 19 on the other side of the cushion. The portions 18 of the strip 13 lie in the groove 15 in the loop portion 9 of the strap 8 and the portions 19 of said strip lie on the flat conduit engaging face of the cushion. The portions 18 are bent by the pressure of the rib on which they lie as shown in Figs. 4 and 5, until they conform to the longitudinal and transverse curvature of the rib and groove as shown in Figs. 2 and 3.

As shown in Figs. 2 and 4 the ends of the cushion are notched as at 20 and the end portions of the strip 13 are fitted in said notched ends and bent to lie flat over the ends of the rib 14 as additional strap engaging portions 21.

It should be noted that the apertures or slots 17 are substantially equal in length to the width of the rib 14 on the cushion and extend through said rib so as not to weaken or impair the cushion appreciably. Fig. 4 shows a cushion and a bonding strip as a preassembled unit ready for application to the strap.

As shown in Fig. 6 a modified form of the clip comprises a metallic strap 23 identical as to construction with the strap 8 in that it is provided with a groove 24 and a rib 25. The cushion 26 is of the same construction as cushion 12 except that no slots or apertures are formed therein. A rib 27 on the cushion fits in the groove 24 in the strap in the same manner as shown at Fig. 3.

The main difference between this form of the clip and that shown in Figs. 1 to 5 inclusive is that in the modified form the bonding strip 28 is wrapped longitudinally around the cushion, so that a length 28' thereof equal to the length of the cushion lies on the conduit engaging face of the cushion while end portions 28'' lie between the cushion and strap in contact with the latter. The cushion may be cemented or otherwise adhered to the strap if desired. Preferably the ends of the cushion 26 are formed with notches 26' to receive the bonding strip 28 and hold the same in alignment with the cushion.

It will now be seen that by reason of the interlock of the cushion and strap and the manner of associating the bonding strip therewith the cushion will be reliably held in proper position and the bonding strip likewise maintained in good electrical contact with the strap and conduit under all conditions over long periods of use of the clip.

The structural stability and efficiency of the clip are enhanced by reason of the cushion and strap having flat comparatively wide contacting or seating surfaces on opposite sides of the rib and groove formation thereof and in having said rib and groove formation extending circumferentially along the median lines of the strap and cushion.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a clip for supporting a metallic conduit line in an airplane, a metallic conduit embracing strap adapted to be secured to and in contact with a metallic part of the airplane, said strap having a groove extending circumferentially relative thereto, and seating surfaces extending circumferentially on opposite sides of the groove, a resilient conduit embracing cushion of insulation material having a longitudinal rib engaged in said groove and longitudinal seating surfaces on opposite sides of said rib for contacting the seating surfaces on the strap, and a bendable metallic grounding strip lying in part in said groove and in part on the face of the cushion exposed for contact with the conduit, for electrically bonding the conduit to said metal part of the airplane.

2. In a clip for supporting a metallic conduit line in an airplane, a metallic conduit embracing strap adapted to be secured to and in contact with a metallic part of the airplane, said strap having a groove extending circumferentially relative thereto, and seating surfaces extending circumferentially on opposite sides of the groove, a resilient conduit embracing cushion of insulation material having a longitudinal rib engaged in said groove and longitudinal seating surfaces on opposite sides of said rib for contacting the seating surfaces on the strap, and a bendable metallic grounding strip lying in part in said groove and in part on the face of the cushion exposed to contact with the conduit, for electrically bonding the conduit to said metal part of the airplane, the groove engaging part of said strip being distorted by pressure of the rib so as to conform to the circumferential and transverse contours of the rib and groove respectively.

3. In a clip for supporting a metallic conduit line in an airplane, a metallic conduit embracing strap adapted to be secured to a metallic part of an airplane in contact therewith, having a groove extending circumferentially relative thereto, a resilient conduit embracing cushion of insulation material lying upon the inner face of said strap, a resilient rib on said cushion and engaged in said groove for holding the cushion and strap against relative axial movement, and a bendable metallic grounding strip extending lengthwise of said cushion with a part thereof held in said groove by said rib and conforming to the circumferential and transverse contours of the groove and rib, and another part thereof disposed on said cushion for contact with the conduit for electrically bonding the conduit to said metallic part of the airplane.

4. In a clip for supporting a metallic conduit line in an airplane, a metallic conduit embracing strap adapted to be secured to a metallic part of the airplane, a strap-like cushion of resilient insulation material lying on the inner face of said strap for embracing and providing a cushioned seat for the conduit, said cushion and strap having interfitted portions extending circumferentially thereof on their opposed faces to prevent relative movement of the cushion and strap, and a bendable metallic bonding strip having a portion disposed on the cushion for contact with the conduit and another portion held between and conforming to the circumferential and transverse contours of said interfitted portions and in electrical contact with said strap for electrically bonding the conduit to said metal part of the airplane, said interfitted portions comprising an arcuate rib formed on the cushion and an arcuate rib receiving groove formed in the strap.

5. In a clip for supporting a metallic conduit line in an airplane, a metallic conduit embracing strap adapted to be secured to a metallic part of the airplane, a strap-like cushion of resilient insulation material lying on the inner face of said strap for embracing and providing a cushioned seat for the conduit, said cushion and strap having interfitted portions extending circumferentially thereof on their opposed faces to prevent relative movement of the cushion and strap, and a bendable metallic bonding strip having a portion disposed on the cushion for contact with the conduit and another portion held between and conforming to the circumferential and transverse contours of said interfitted portions and in electrical contact with said strap for electrically bonding the conduit to said metal part of the airplane, said interfitted portions comprising an arcuate rib formed on the cushion and an arcuate groove formed in the strap, said rib and groove being semi-circular in cross section.

6. In a clip for supporting a metallic conduit line in an airplane, a metallic conduit embracing strap having terminals adapted to be secured to and in contact with a metallic part of an airplane, said strap having a groove extending circumferentially on the inner face thereof which groove defines a reinforcing rib on the outer face of the strap, a cushion of flexible resilient insulation material lining said strap and providing a cushioned seat for the conduit, a rib extending lengthwise of said cushion, engaged in said groove to prevent relative movement of the strap and cushion, and a flexible metallic bonding strip disposed in part in said groove, and in contact with the strip and in part on the cushion for contact with the conduit to electrically bond the conduit through said strap to the metal part of the airplane.

7. In a clip for supporting a metallic conduit line in an airplane, a metallic conduit embracing strap having terminals adapted to be secured to and in contact with a metallic part of an airplane, said strap having a groove on the inner face thereof which groove defines a reinforcing rib on the outer face of the strap, a cushion of flexible resilient insulation material lining said strap and providing a cushioned seat for the conduit, a rib on said cushion engaged in said groove to prevent relative movement of the strap and cushion, and a flexible metallic bonding strip disposed in part in said groove and in contact with the strip and in part on the cushion for contact with the conduit to electrically bond the conduit through said strap to the metal part of the airplane, said cushion having notched ends in which portions of the strip are engaged.

8. In a clip for supporting a metallic conduit line in an airplane, a metallic conduit embracing strap having terminals adapted to be secured to and in contact with a metallic part of an airplane, said strap having a groove on the inner face thereof which groove defines a reinforcing rib on the outer face of the strap, a cushion of flexible resilient insulation material lining said strap and providing a cushioned seat for the conduit, a rib on said cushion engaged in said groove to prevent relative movement of the strap and cushion, and a flexible metallic bonding strip disposed in part in said groove and in contact with the strip and in part on the cushion for contact with the conduit to electrically bond the conduit through said strap to the metal part of the airplane, said strip being wrapped longitudinally around said cushion so that the ends thereof lie between the strap and the cushion.

HAROLD E. WEBB.